C. A. FEWELL.
CATTLE GUARD.
APPLICATION FILED FEB. 13, 1912.

1,039,917.

Patented Oct. 1, 1912.

WITNESSES
Fenton S. Belt
A. L. Hough

INVENTOR
C. A. Fewell,
By Franklin N. Hough
Attorney

COLUMBIA PLANOGRAPH CO., WASHINGTON, D. C.

UNITED STATES PATENT OFFICE.

CICERO ALEXANDER FEWELL, OF GLENWOOD, ARKANSAS.

CATTLE-GUARD.

1,039,917.  Specification of Letters Patent.  Patented Oct. 1, 1912.

Application filed February 13, 1912. Serial No. 677,359.

*To all whom it may concern:*

Be it known that I, CICERO A. FEWELL, a citizen of the United States, residing at Glenwood, in the county of Pike and State of Arkansas, have invented certain new and useful Improvements in Cattle-Guards; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cattle guards for railways and provides a simple and efficient means so arranged that the weight of an animal coming upon the apparatus will cause a fence or obstruction to be raised to arrest its further progress, the parts returning to their normal positions after the weight has been removed from the apparatus.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1:
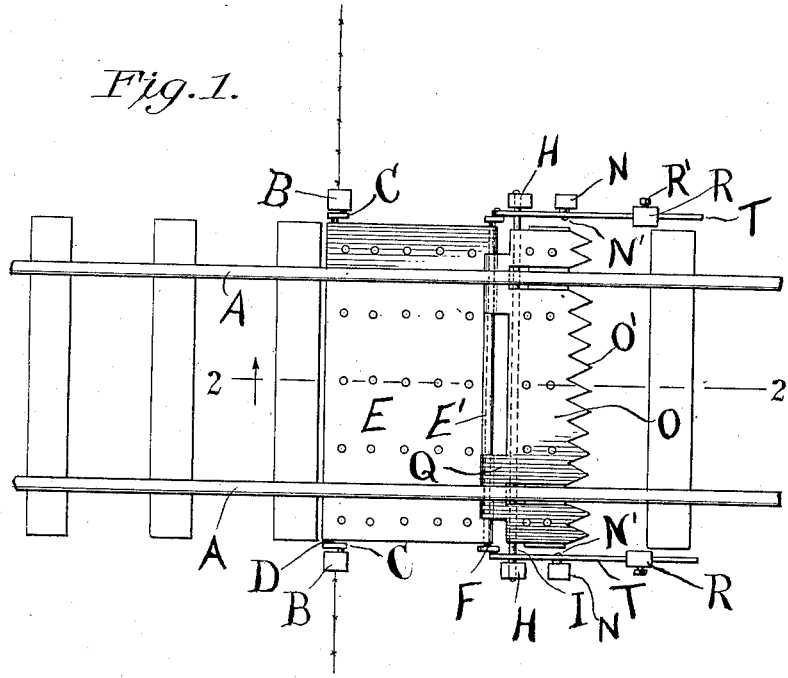
Figure 2:
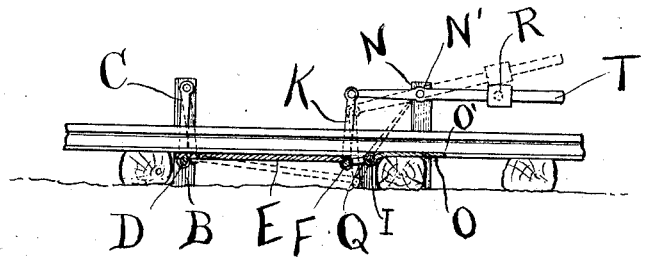

Figure 1 is a top plan view showing the application of the invention, and Fig. 2 is a sectional view on line 2—2 of Fig. 1.

Reference now being had to the details of the drawings by letter, A, A designate the usual tracks of a railway, and pivotally mounted upon the posts B are the hangers C, the lower ends of which are pivotally connected to a shaft D upon which the outer end of the platform E is pivoted, the forward end carrying a shaft or rod F mounted in a roll E′ formed at one edge of the platform. Posts H have pivotally mounted therein a shaft I upon which a swinging gate O is journaled, which gate has forwardly projecting portions Q which are journaled upon the shaft F.

Posts N have pivotal pins N′ fixed thereto upon which the levers T are pivoted and which are pivotally connected to the links K which in turn are pivotally connected to the shaft F, and each of the levers T has a weight R adjustably mounted thereon. The weights R have set screws R′ mounted therein, serving as means whereby the weights may be held in adjusted positions upon the lever. It will be noted that the gate O is provided with serrations O′ upon one edge which, when the gate is thrown to an upright position, will serve to assist in arresting further progress of an animal which might make an attempt to pass by the cattle guard.

In operation, it will be noted that the counterbalanced weights will serve to hold the parts as shown in solid lines in Fig. 2 of the drawings, in which the gate will be below the plane of the tread surface of the rails. When an animal attempts to pass between the posts B and stepping upon the platform will cause the latter to be depressed and assume the position shown in dotted lines in Fig. 2, which will cause the gate to be thrown to an upright position. After the weight is removed from the platform, the parts will return to their normal positions through the medium of the counterbalance weights.

What I claim to be new is:—

A cattle guard comprising oppositely disposed posts, hangers having angled ends pivotally mounted in said posts, a shaft adapted to be supported by the hangers beneath the rails of the railway, a platform resting at one edge upon said shaft, pivotal weighted levers, posts upon which the same are mounted, the edge of said platform opposite the one supported by said shaft being recessed, a shaft journaled in projections upon the recessed edge of the platform, links connecting the ends of said shaft which is carried by the platform with the ends of said weighted levers, a tilting gate and shaft upon which the same is mounted, said gate having lateral projections upon one edge which are pivotally connected to the shaft mounted upon the recessed edge of the platform, said gate being recessed to allow portions thereof to swing on either side of the tracks, as set forth.

In testimony whereof I hereunto affix my signature in the presence of two witnesses.

CICERO ALEXANDER FEWELL.

Witnesses:
WILLIAM M. FAGAN,
GALLANT P. COKER.

Copies of this patent may be obtained for five cents each, by addressing the "Commissioner of Patents, Washington, D. C."